United States Patent [19]

Miyazaki et al.

[11] Patent Number: 4,868,884
[45] Date of Patent: Sep. 19, 1989

[54] IMAGE EXTRACTION MASK

[75] Inventors: Ryuichi Miyazaki, Kameoka; Yosuke Kakihara, Otsu; Yasushi Doi; Hirokazu Takizawa, both of Kyoto, all of Japan

[73] Assignee: Dainippon Screen Mfg. Co., Ltd., Kyoto, Japan

[21] Appl. No.: 136,482

[22] Filed: Dec. 21, 1987

Related U.S. Application Data

[63] Continuation of Ser. No. 676,382, Nov. 29, 1984, abandoned.

[30] Foreign Application Priority Data

Dec. 30, 1983 [JP] Japan ................................ 58-247934

[51] Int. Cl.⁴ .............................................. G06K 9/62
[52] U.S. Cl. ......................................... 382/30; 382/22; 382/32; 382/50
[58] Field of Search ........................ 382/22, 30, 32, 50, 382/59, 60, 61; 358/78, 80, 96; 340/701, 707, 708

[56] References Cited

U.S. PATENT DOCUMENTS

| | | | |
|---|---|---|---|
| 4,021,778 | 5/1977 | Ueda et al. | 382/30 |
| 4,437,161 | 3/1984 | Anderson | 382/54 |
| 4,472,736 | 9/1984 | Ushio et al. | 382/50 |
| 4,488,245 | 12/1984 | Dalke et al. | 358/80 |
| 4,538,182 | 8/1985 | Saito et al. | 358/80 |
| 4,564,915 | 1/1986 | Evans et al. | 340/701 |
| 4,583,116 | 4/1986 | Hennig et al. | 358/75 |
| 4,617,592 | 10/1986 | MacDonald | 358/78 |

FOREIGN PATENT DOCUMENTS 2035611 10/1978 United Kingdom .
2121534 4/1982 United Kingdom .
0160526 4/1984 United Kingdom .

Primary Examiner—Leo H. Boudreau
Assistant Examiner—Jose L. Couso
Attorney, Agent, or Firm—Lowe, Price, LeBlanc, Becker & Shur

[57] ABSTRACT

By comparing the density values of the pixels of a specific color separation image of an original comprising an objective image stored as data in an image memory with a threshold, determining a border line between the area of which density value is higher than the threshold and the area of which density value is lower than the threshold as the conclusive outline of the objective image, and by applying to both the areas distinct data respectively, an image extraction mask data is obtained to be stored into a mask memory.

18 Claims, 13 Drawing Sheets

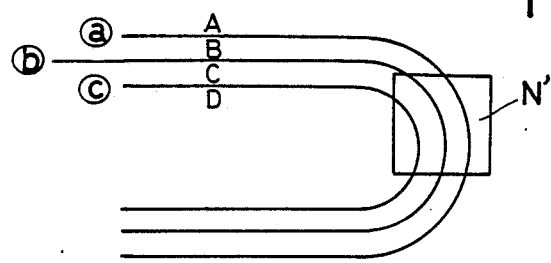
FIG. 1(a)
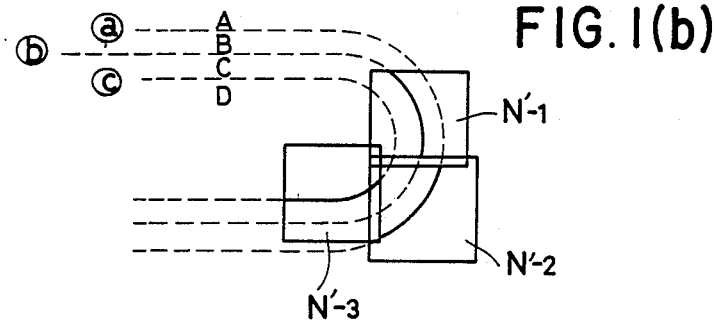
FIG. 1(b)
FIG. 2
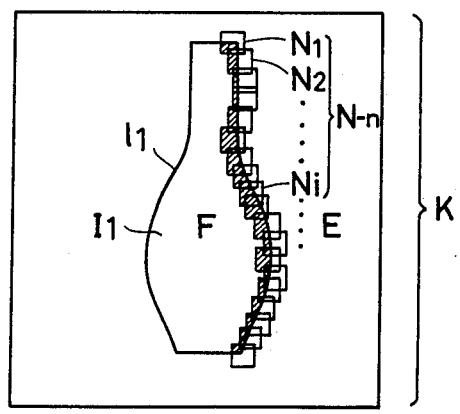

Ma
Mb

IMAGE EXTRACTION MASK

This application is a continuation of application Ser. No. 676,382, filed Nov. 29, 1984 now abandoned.

FIELD OF THE INVENTION

This invention relates to an image extraction mask, and more particularly to a method and system for forming an image extraction mask in an electronic image reproduction system.

BACKGROUND OF THE INVENTION

It is well known that a constituent of an image is often desired to be extracted therefrom to be used independently or in combination with other images to produce another image in the field of electronic image reproduction. Practically, for example, when only a commodity image printed with the background must be extracted therefrom to be printed onto a catalogue, an image extraction masking method is adopted for that use. That is by using a conventional method in which by superimposing an image extraction masking film which is composed of a transparent portion corresponding to the image component to be extracted and an opaque portion corresponding to the unnecessary portion onto the original or a reproduction image thereof by means of a photographic technique, a reproduction image eliminated of the unnecessary portion can be obtained.

The background portion of the image in which a desired image is to be framed can also be extracted instead therefrom by using the method. In passing, the method is also capable of producing a negative reproduction image from a positive original.

The conventional image extraction mask film forming process has required manual work. That is, by at first tracing the outline of a determined objective image onto a transparent sheet by means of a kind of tracing method, and then by painting out the inside or the outside of the outline, an image extraction masking film is produced. Because this work require special skill and long time, the conventional image extraction mask producing process has been a main problem in the photomechanical process.

To overcome the above problem, a method by which the unnecessary portion of a reproduction image of an original is painted out with an opaque ink, and a method by which the unnecessary portion is covered with a so-called peel-off film substituting for said ink are disclosed; however, these methods have little effect on reducing time consumed in the masking process.

Japanese Patent Laid Open No. 47-17501 discloses another method, in which an image extraction mask is obtained at first by donating a specific color to the unnecessary portion of an image in taking a color photograph thereof, and then by extracting or erasing the unnecessary portion to which the specific color is donated. Obviously, this method is not suitable for processing colored originals.

In order to resolve the drawbacks of the above-mentioned conventional methods, Japanese Patent Application No. 53-13119 (Laid Open No. 55-57846) discloses a method, in which the outline of a determined objective image electronically detected by means of a sensor composed of photoelectronic materials are afterwards manually traced to produce an image extraction mask. Meanwhile, Japanese Patent Application No. 56-52106 (Laid Open No. 57-165836) discloses a method, in which an image extraction mask is formed according to address data previously obtained using an address designation means such as a digitizer and an image signal obtained by analyzing the image of the original comprising the determined objective image using an image input means, such as image sensors.

Japanese Patent Laid Open No. 58-176638 discloses a semi-automatic image extraction masking method as follows. First, an approximate outline of an objective constituent image is determined. Secondly, a plurality of sections, each of which is called a partial area hereinafter, including the approximate outline in a group are determined. Thirdly, a voltage corresponding to the average density of each of the partial areas (composed of several pixels) is set up as a threshold. Then the conclusive outline of the objective constituent image defined as the border line between the area (pixels) of which a corresponding voltage is higher than the threshold and the area (pixels) of which a corresponding voltage is lower than the threshold of each partial area is detected.

However, it must be noted at this juncture that the above method becomes fatal, for example, in the following case. Assuming that a partial area $N'$ of the average density P comprises four distinct density areas A, B, C, and D sharing border lines ⓐ, ⓑ and ⓒ in between respective adjoining areas as shown in FIG. 1(a); (1) the border line ⓐ becomes the conclusive outline when $A > P \geq B$, (2) the border line ⓑ becomes the conclusive outline when $B > P \geq C$, or (3) the border line ⓒ becomes the conclusive outline when $C > P \geq D$. As is obvious from the above example, the method is not capable of detecting a plurarity of border lines (outlines) at a time; in other words, no belt-shape area having an identical density value such as the area B or C can be detected.

Furthermore in the above method, since the partial area $N'$ is determined according to an approximate outline of an objective constituent image, the partial areas $N'_{-1}, N'_{-2}, N'_{-3}...$ do not always have the same relation to the actual outline thereof as shown in FIG. 1(b). Therefore the average densities (thresholds) of the partial areas $N'_{-1}, N'_{-2}, N'_{-3}...$ normally differ, which results in obtaining a discontinuous outline, concretely the border lines ⓑ, ⓐ and ⓒ become the conclusive outlines for the partial areas $N'_{-1}, N'_{-2}$ and $N'_{-3}$ respectively in the case of FIG. 1(b).

Of course, data of such a discontinuous outline are put to a correction process; however, the correction process is not always performed perfectly.

SUMMARY OF THE INVENTION

It is an object of this invention to provide a novel method and system for forming an image extraction mask for extracting a drawing or a complicated constituent image as well as a simple constituent image from respective originals semiautomatically detecting the outline thereof accurately.

In order to detect the outline of an objective image, the density values of the pixels around the objective image stored as data in an image memory are compared with a specific threshold in this invention.

At this juncture, practically one of the color separation images Y (Yellow), M (Magenta), C (Cyan) and K (Black) of the objective image is submitted to the detection process. If the selected color separation image comprises an unclear portion on the outline of the objective image, the corresponding portion of another color separation image is used instead.

To promptly perform the detection process, at first data of the objective image is output from the image memory to a display monitor. Then a plurality of partial areas which cover the outline of the objective image in a group are successively established, on which partial areas the detection process is carried out. It should be noted in this that the detection process is carried out on the whole (color separation) image in which the objective image is comprised when the shape thereof is complicated and distributed onto the whole (color separation) image (for example, when the objective image is a lattice).

The threshold is determined to be in between the density value of the objective image and that of the background image. Furthermore, by using two thresholds, a belt-shape image put between two areas of distinct density values can be detected.

Both sides of thus-detected outline are distingushable mask data respectively which are to be stored into a mask memory. The mask data, which indicates the state of the areas of different densities, is a combination of a logical "1" and "0", wherein, for example a logical "1" indicates the area to be extracted.

The mask data can be further synthesized by means of a computation with a ground mask data separately provided to obtain a more complicated image extraction mask data.

The above and other objects and features of this invention can be appreciated more fully from the following detailed description when read with reference to the accompanying drawings.

BRIEF DESCRIPTION OF THE DRAWINGS

FIG. 1(a)-1(b) shows a partial area establishing process of a conventional method for producing an image extraction mask.

FIG. 2 shows the nozzle establishing process of the method for forming an image extraction mask of this invention.

PREFERRED EMBODIMENT OF THE INVENTION

FIG. 2 shows the method of this invention, in which the outline $l_1$ of an objective image $I_1$ having a density value F surroundeed by a background having a density value E is to be detected, which image and background are included in an image K. Supposing that, the density values E and F are in a relation $E<F$, at first a threshold S satisfying an inequality $E<S<F$ is determined. Then by comparing the threshold S with the density values of the whole area of the image K, the outline $l_1$ of the image $I_1$ is detected as the border line between the area of which density value is higher than the threshold S and the area of which density value is lower than the threshold S.

Practically, the above operation is carried out on the image $I_1$ displayed on a display monitor (for example, a CRT display monitor). Furthermore, to shorten the time required, the above-mentioned process is desirably carried out on the pixels situated around the outline $l_1$. So in this invention, at first partial areas $N_{-1} \ldots N_{-i} \ldots$ which cover outline $l_1$ in a group are established as shown in FIG. 2, secondly the density values of the pixels included in each of the partial areas are compared with the threshold S, then the conclusive outline $l_1$ is determined in every partial area (partial density difference mask producing process). After the process, by painting out the inside (in this case, the objective image $I_1$ whose density value F is higher than the threshold S) or the outside (in this case, the background whose density value E is lower than the threshold S) of the conclusive outline $l_1$ according to a previously input designation data, a desired image extraction mask data can be obtained.

Figure 3:
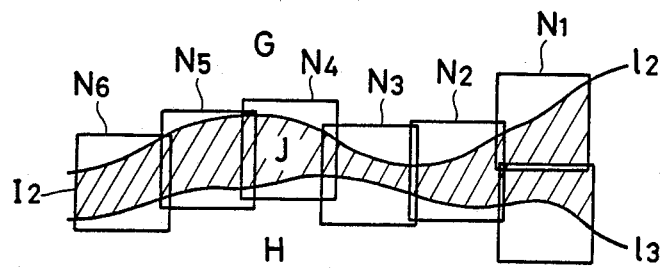
FIG. 3 shows the nozzle establishing process of the method for forming a belt-shape image extraction mask of this invention.

FIG. 3 shows a case in which the outlines $l_2$ and $l_3$ of an image $I_2$ having a density value J between areas of which density values are G and H ($G<J<H$) are detected. In this case, by comparing the density values G, J and H with two thresholds $S_2$ and $S_3$ ($G<S_2<J<S_3<H$), the image $I_2$ of which density value is in between the threshold values $S_2$ and $S_3$ can be detected.

Figure 4:
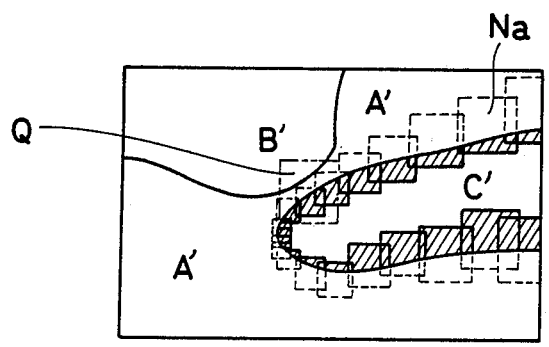
FIG. 4 shows the variable-size partial area establishing process for forming an image extraction mask of this invention.

Other than the above principal matters, the size of the partial area can be varied. For example, when the area of density value C' being in an intricate image composed of areas of densities A', B' and C' as shown in FIG. 4 must be extracted therefrom, the most complicated portion Q cannot be analyzed with a partial area of the same size as a partial area $N_a$. If that is nevertheless done, a wrong border line is detected at a high rate. Therefore, a partial area reduced to the extent to be able to detect the correct outline is used.

In passing, the threshold(s) can also be variable in order to manage the variation of the boundary areas to be analyzed.

It must further be noted that when one color separation image, for example, Y color separation image out of color separtion images Y, M, C and K of an image does not have the clear outline of an objective image, another color separation image showing the definite outline thereof can be submitted to the detection process instead.

Figure 15A:
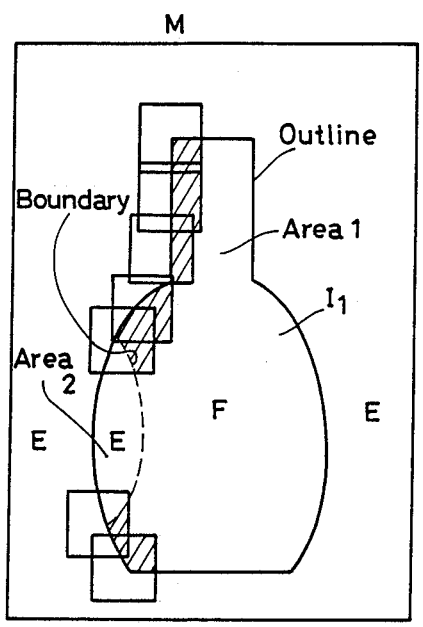
FIG. 15(a)-(c) shows a method for obtaining image extraction mask data by changing over the color separation image to be processed.
Figure 15B:
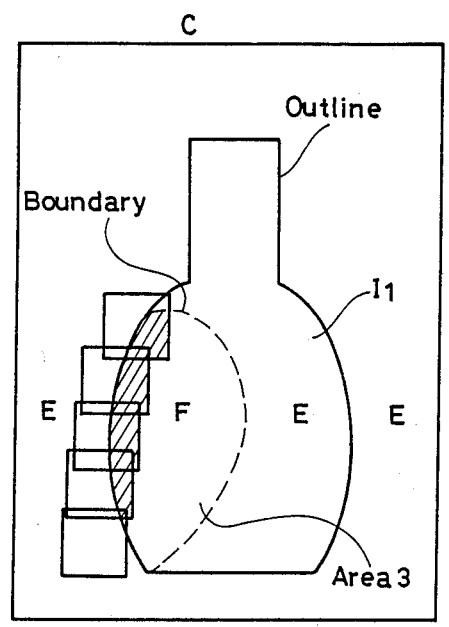
Figure 15C:
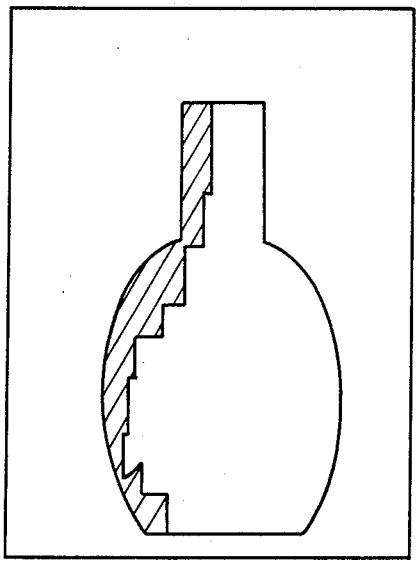

FIG. 15(a)–(c) shows an image $I_1$ submitted to the detection process. The area 1 of the image $I_1$ is detected by using the M color separation image thereof (refer to FIG. 15(a)). However, since the area 2 of the M color separation image has almost the same density that the background has, no outline thereof can be detected. In this case, the objective color separation image M is switched to C color separation image to detect the clear outline of the area 2, and thus-detected outlines of the areas 1 and 2 are put together as shown in FIG. 15(c).

When all the color separation images have no clear outline, the outline is obliged to be traced manually by means of, for example, a conventional stylus pen.

Figure 5A:
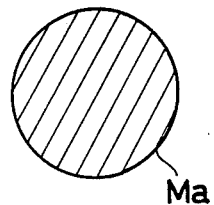
FIG. 5(a)-(d) shows the concept of computation modes of synchronizing mask data obtained from an objective image with ground mask data.
Figure 5B:
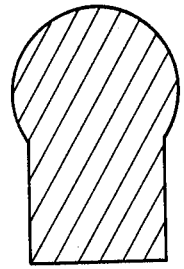
Figure 5C:
Figure 5D:
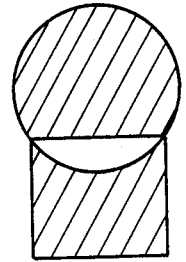

This invention is further capable of synthesizing a mask data obtained from an objective image as in the above-mentioned way with a ground mask data previously input to a disk memory. Supposing that two mask data $M_a$ and $M_b$ are to be synthesized, there can be prepared three modes of computation such that: (i) the logical OR of both mask data is computed as shown in FIG. 5(b); (ii) the logical AND of both mask data is computed as shown in FIG. 5(c); and (iii) the logical Exclusive-OR of both mask data is computed as shown in FIG. 5(d).

Figure 6:
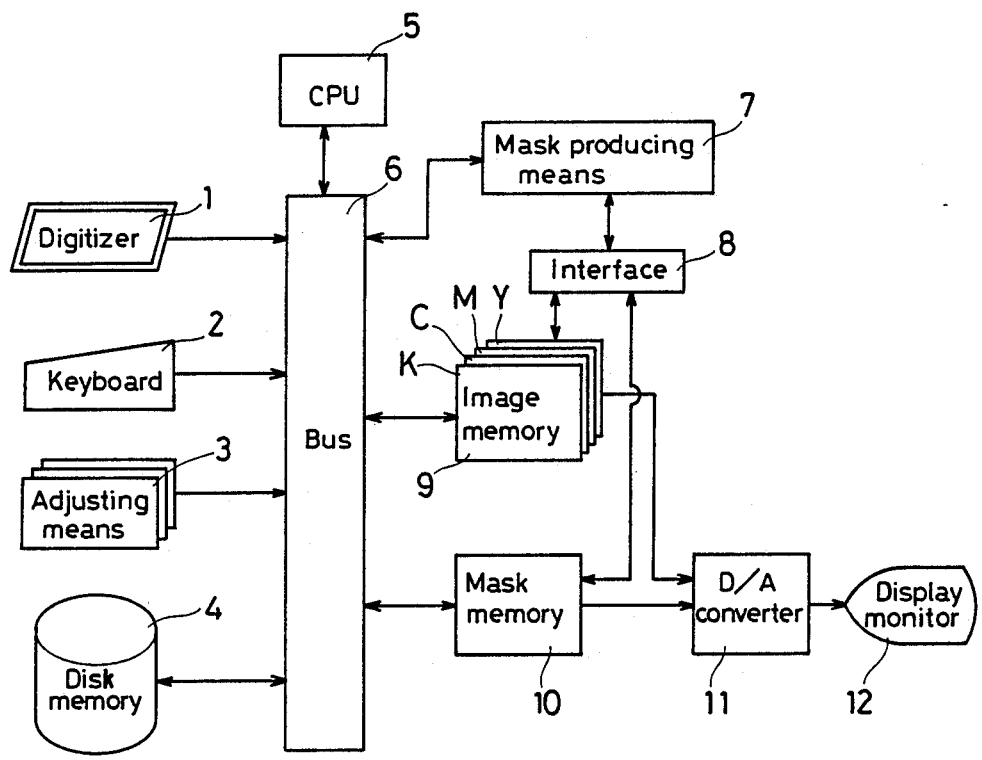
FIG. 6 shows a system of this invention.

FIG. 6 shows a schematic diagram of a system of this invention.

Data of color separation images Y (Yellow), M (Magenta), C (Cyan) and K (Black) of the image which comprises a determined objective image to be processed out of all the image data stored in a disk memory 4 is at first transmitted to respective image memories 9. When ground mask data must be used together for the process, the data is transmitted from the disk memory 4 to a mask memory 10. Then the image data stored in the image memories 9 and the ground mask data stored in the mask memory 10 are brought via a D/A converter 11 comprising a YMCK/BGR converter to a display monitor 12 to display the corresponding images thereon. Then a plurality of partial areas are established successively around the outline of the objective image by using a digitizer 1 and a stylus pen, and subsequently an image extraction mask data is produced by painting out the unnecessary portion using a mask producing means 7 via an interface 8 to be input to the mask memory 10. The whole system is controlled by a CPU 5 via a bus 6, to which the necessary data are input from a digitizer 1, a keyboard 2 and an adjusting means 3 such as a variable resistor.

FIGS. 7, 8, 9, 10 and 11 show a flow chart of the operation of a system of this invention.

Figure 7:
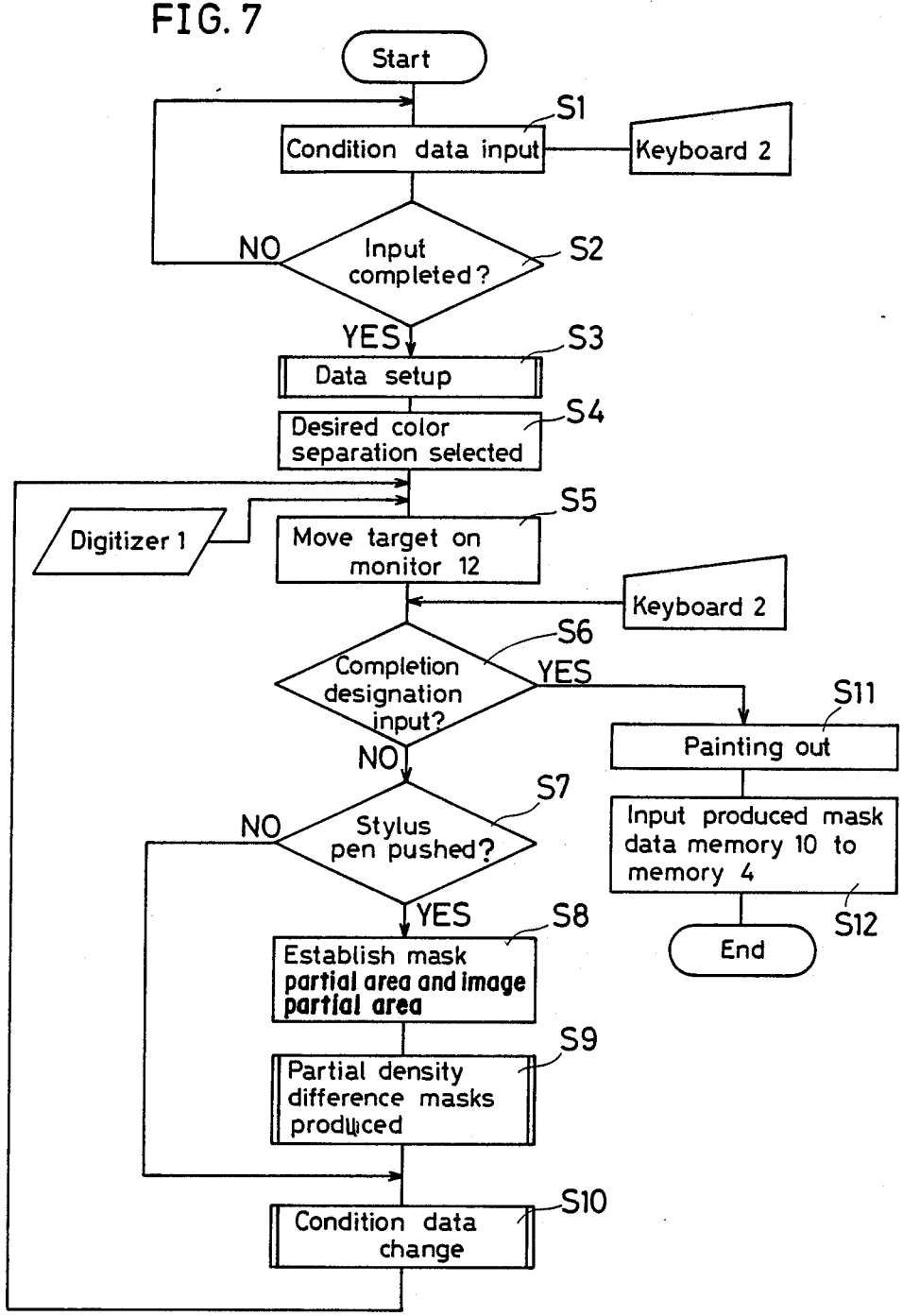
FIG. 7 shows a flow chart of the operation of the system shown in FIG. 6.

In FIG. 7, the following masking condition data are input from the keyboard 2 to the mask producing means 7—($S_1$).

(1) (i) The number and the location of an objective image (including monochrome and color images).

(ii) The number and the location of a desired ground mask.

(iii) Color separation image (Y, M, C or K) to be submitted to the mask producing process when the objective image is colored.

(2) Computation mode (OR, AND or Exclusive-OR) of the relation between the mask obtained from the objective image and the ground mask.

(3) Standard threshold S.

(4) One of the following Modes ①, ② and ③ for producing partial density difference masks.

① A mode in which the area whoes density value is higher than a threshold S corresponds to a logical "0" and the other area whose density value is lower than the threshold S corresponds to a logical "1", both the areas composing a partial area.

② A mode in which the area whose density value is higher than the threshold S corresponds to a logical "1", and the other area whose density value is lower than the threshold S corresponds to a logical "0", both the areas composing a partial area.

③ A mode in which the area whose density value is in between two thresholds $S_a$ and $S_b$ corresponds to a logical "1" (or "0") and the other area whose density value is more than the higher threshold or less than the lower threshold corresponds to a logical "0" (or "1"), both the areas composing a partial area.

(5) Standard partial area size.

Figure 8:
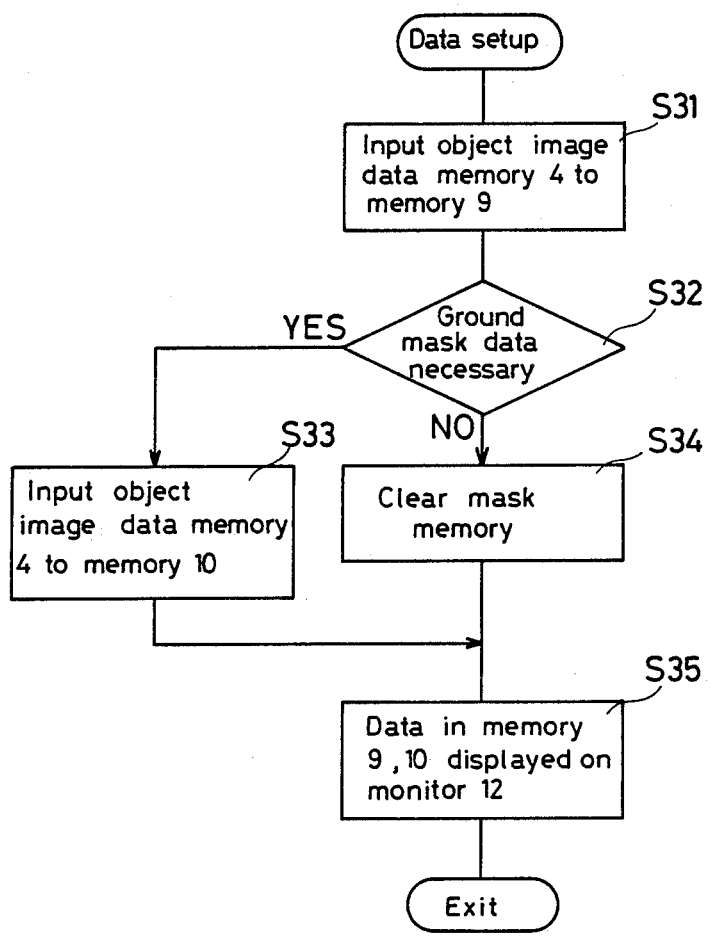
FIG. 8 shows a detailed flow chart of the initial data setting process shown in the flow chart of FIG. 7.
Figure 14:
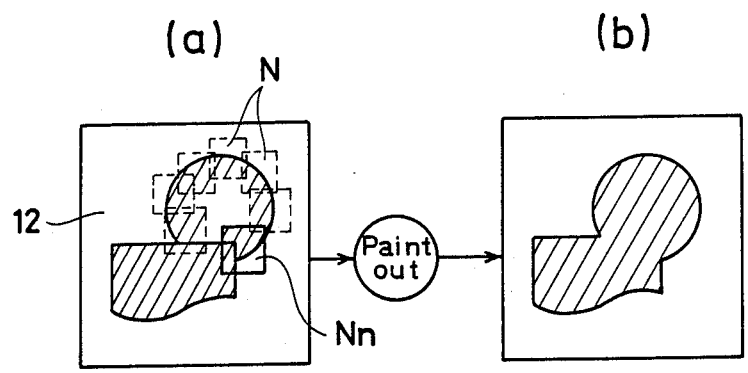
FIG. 14(a)-(b) shows a process in which synthesis image extraction mask data is made.

When an operator inputs a data input completion signal from the keyboard 2—($S_2$), the CPU 5 displays the data of the image to be submitted to the mask producing process on the display monitor 12 according to the way shown in FIG. 8—($S_3$). When ground mask data are needed, the data are displayed on the display monitor 12 together with said image data as shown in FIG. 14. Practically, the data of the image to be submitted to the mask producing process is selected from all the image data stored in the disk memory 4, and the data of the color separation images Y, M, C and K thereof are transmitted to the image memory 9 as indicated in FIG 8—($S_{31}$). When the ground mask data must be used together—($S_{32}$: YES), the data stored in the disk memory 4 is input to the mask memory 10—($S_{33}$). When no ground mask data is necessary—($S_{32}$: NO), the content of the mask memory 10 is cleared—($S_{34}$). Then the data stored in the image memory 9 and the mask memory 10 are displayed on the display monitor 12—($S_{35}$).

After that the color separation image data designated in said masking condition data setup process is output from all the color separation image data stored in the image memory 9 and is made to be ready for being output via an interface 8 to the mask data producing means 7—($S_4$).

Subsequently, a target point T is moved toward a point at which a partial area is desired to be established along the outline of the image displayed on the display monitor 12 by means of the digitizer and the stylus pen—($S_5$). Since no completion designation signal is input yet—($S_6$: NO), by pinpointing the corresponding point of the digitizer 1 with the stylus pen—($S_7$: YES), a partial area of the size designated in the step $S_1$ (Data (5)) is displayed at the desired point on the display monitor 12.

Figure 12:
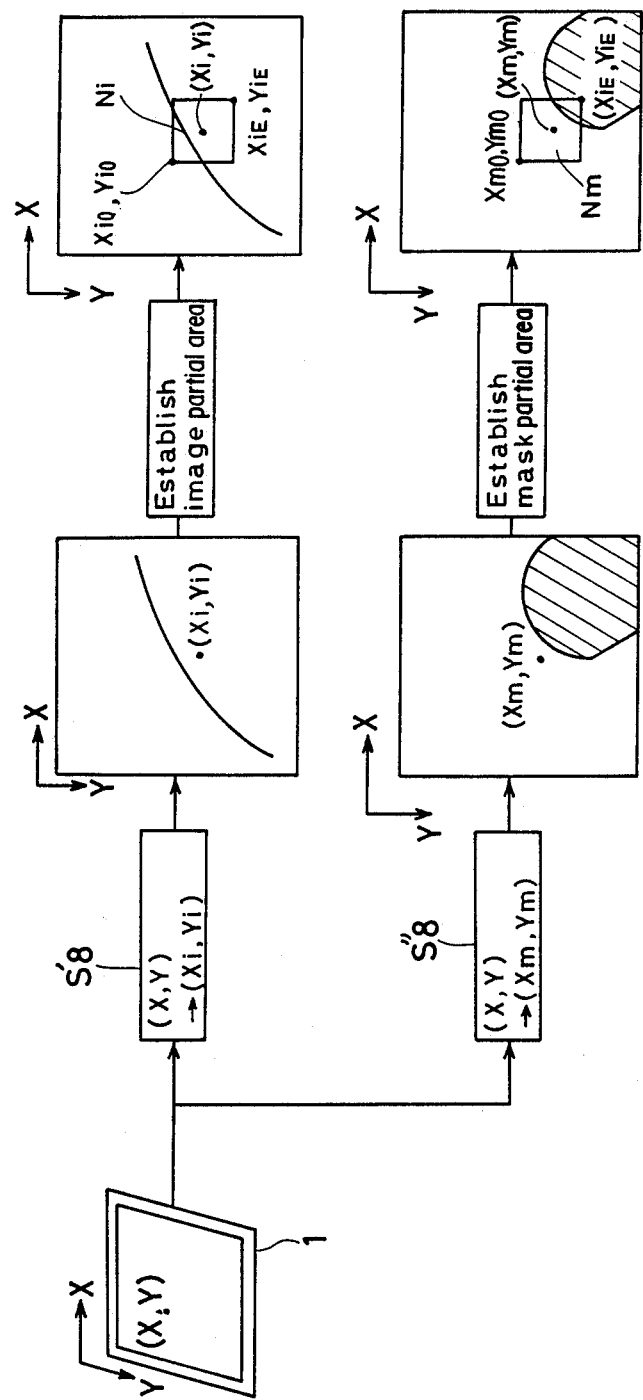
FIG. 12 shows a process in which a partial area is established in an image memory and a mask memory.

FIG. 12 shows the detail of the partial area setup process. When a point of the coordinate value (X, Y) on the digitizer 1 is pushed by the stylus pen, the coordinate value (X, Y) is converted into a corresponding coordinate value $(X_i, Y_i)$ of the image memory—($S_8$). Then by using the data of the coordinate value $(X_i, Y_i)$ and the partial area (W×W), the coordinate value $(X_{iO}, Y_{iO})$ of the analysis start point of the partial area being expressed as $(X_i-W/2, Y_i-W/2)$, and the coordinate value $(X_{iE}, Y_{iE})$ of the examination scanning stop point of the partial area being expressed as $(X_i+W/2, Y_i+W/2)$ are computed to establish an image partial area $N_i$ as shown in FIG. 12.

A corresponding mask partial area $N_m$ is established on the same location of the mask memory.

Thus established image partial area $N_i$ or the mask partial area $N_m$ is displayed on the display monitor 12.

Figure 9:
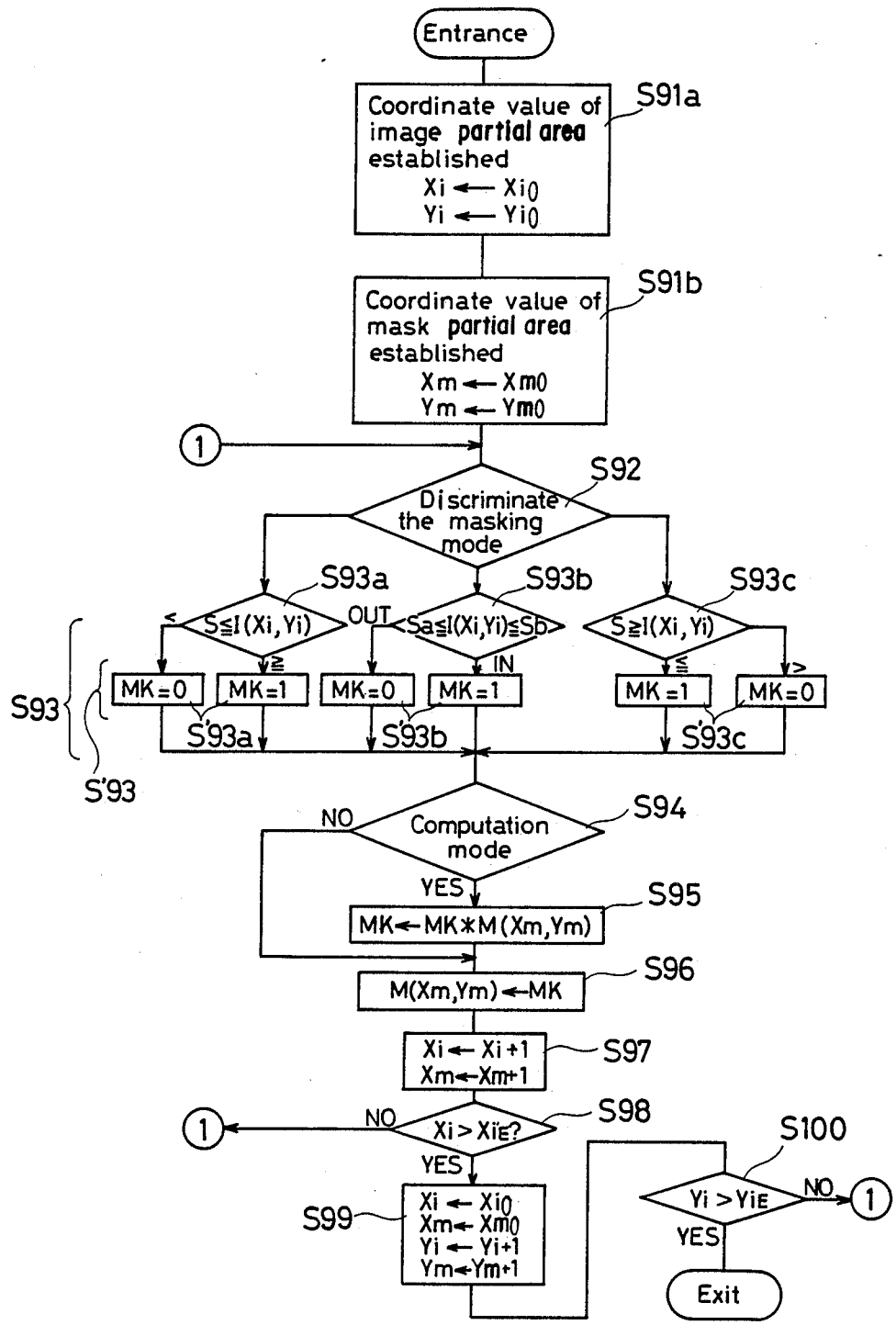
FIG. 9 shows a detailed flow chart of the process for detecting the outline of an objective image in each partial area shown in the flow chart of FIG. 7.

In the thus established partial areas $N_1 \ldots N_i \ldots$, partial density difference masks are produced as in a way described afterwards on FIG. 9—(S9). When the mask producing condition data must be changed, the data are rewritten as in a way described afterwards on FIG. 10—(S10). When the digitizer 1 is not pushed by the stylus pen, steps S8 and S9 are skipped over.

Repeating the steps S5 to S10, partial density difference masks are produced along the outline of the objective image. After completing the partial density difference mask producing process, an operator inputs a completion signal from the keyboard 2. When the completion signal is input—(S6: YES), a designated area is painted out in accordance with the masking condition data—(S11). Thus-constructed data in the mask memory 10 transmitted to the disk memory 4—(S12).

FIG. 9 is a detailed flow chart of the partial density difference mask producing step S9.

At first the coordinate values $(X_{iO}, Y_{iO})$ and $(X_{mO}, Y_{mO})$ (these are the same) of the analysis start points of the image partial area $N_i$ and the mask nozzle $N_m$ respectively are at first determined—(S91a, S91b). Then the kind of the established partial density difference mask producing mode out of the modes ①, ② and ③ described in the mask producing condition data (4) is discriminated—(S92), and partial density difference mask data of the partial areas are produced according to the mode selected—(S93). In this case the partial density difference mask data, composed of the painted-out area corresponding to logical "1" and the other vacant area corresponding to logical "0", are once stored into a mask flag memory MK—(S'93).

Then it is judged that whether a computation mode of the relation between the mask data obtained from the objective image and a ground mask data is input—(S94). When no computation mode is input, the content of the mask flag memory MK is input as it is to the mask memory—(S96).

When a computation mode is input, the data stored in the mask flag memory obtained in the step S'93, (S'93a' S'93b' S'93c) is synthesized with the data stored in the mask memory according to the computation mode in a way as described in FIG. 5—(S95), and the resultant data is input to a specific location of the mask memory 10—(S96).

Incidentally, the mark (*) shown in the step S95 means one of the computation modes of AND, OR, and Exclusive-OR.

After completing the above steps, the X-direction addresses $X_i$ and $X_m$ of the present analyzing point of the image memory 9 and the mask memory 10 are advanced by one respectively—(S97), and the value of the X-direction address $X_i$ ($X_m$) is compared with that of the X-direction address $X_{iE}$ ($X_{mE}$) of the examination scanning stop point of the image partial area $N_i$ (the mask partial area $N_m$)—(S98). When $X_i \leq X_{iE}$ ($X_m \leq X_{mE}$), the processes of the steps S92 to S97 are repeated. When $X_i > X_{iE}$ ($X_m > X_{mE}$), the X-direction address $X_i$ of the image memory 9 and the X-direction address $X_m$ of the mask memory 10 of the present analyzing points are renewed up to the X-direction address $X_{iO}$ ($X_{mO}$) of the present analyzing start point of the image partial area $N_i$ (the mask partial area $N_m$), while the Y-direction address $Y_i$ of the image memory 9 and the Y-direction address $Y_m$ of the mask memory 10 of the present analyzing points are as well advanced by one respectively—(S99). Then the value of the Y-direction address $Y_i$ ($Y_m$) is compared with that of the Y-direction address $Y_{iE}$ ($Y_{mE}$) of the present analyzing stop point of the image partial area $N_i$ (the mask partial area $N_m$)—(S100). When $Y_i \leq Y_{iE}$ ($Y_m \leq Y_{mE}$), the processes of the step S92 and the subsequent steps are repeated. When $Y_i > Y_{iE}$ ($Y_m > Y_{mE}$), the processes of the step S10 and the subsequent steps are repeated.

Figure 13:
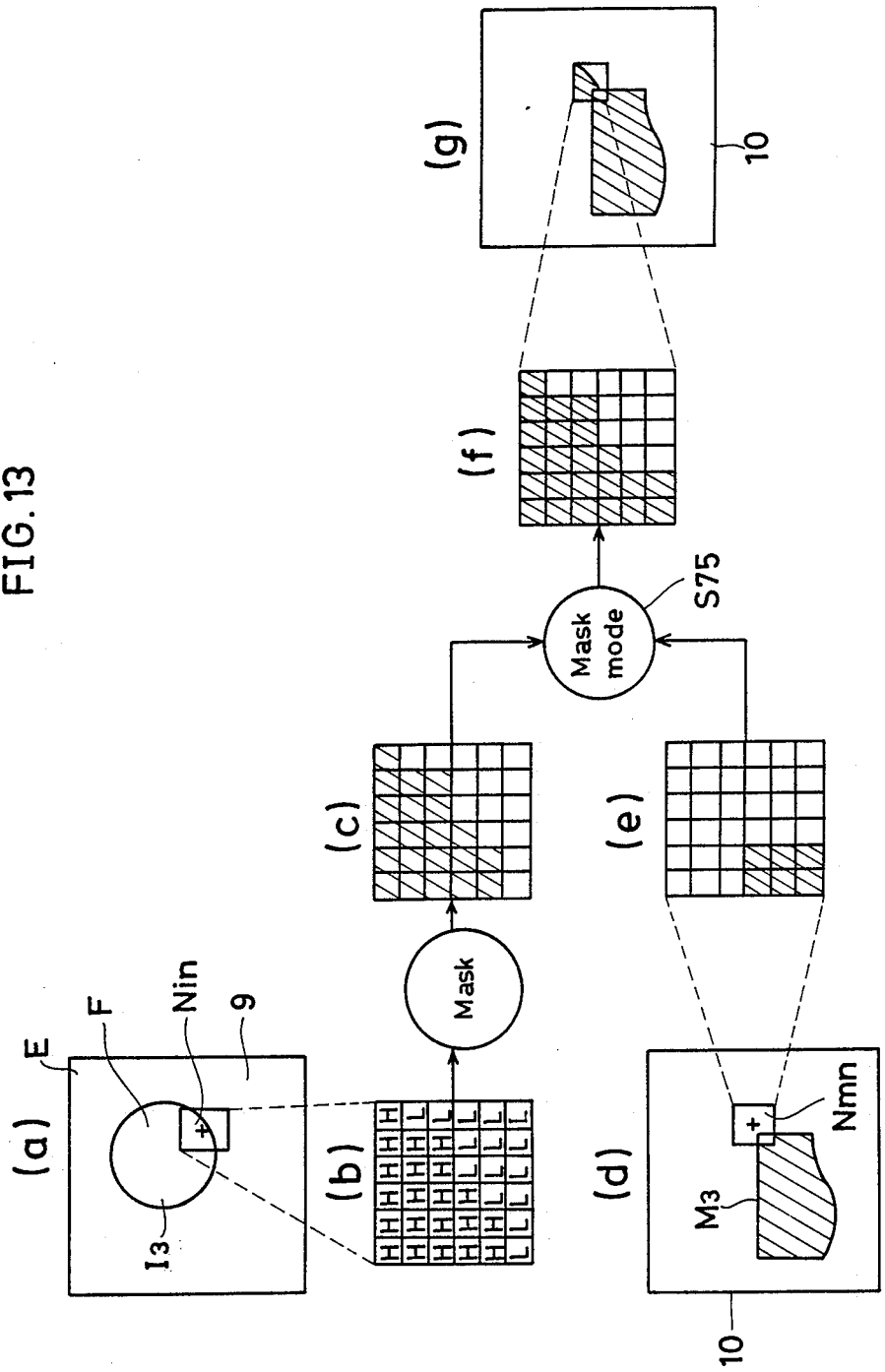
FIG. 13(a)-(g) shows a process in which a partial density difference mask is made by using mask data obtained from an objective image and ground mask data.

When the data of an image I3 displayed on the display monitor 12 is synthesized with the data of the ground mask M3 as shown in FIG. 14(a), each of the pixels comprised in a partial area is processed as shown in FIG. 13. The process corresponds to the steps S93 to S95.

Assuming that the pixels included in a partial area $N_n$ shown in FIG. 14 are to be processed, the partial area $N_n$ corresponds to the image partial area $N_{in}$ of the image memory 9 as well as to the mask partial area $N_{mn}$ of the mask memory 10.

When the density distribution of all the pixels situated inside the partial area $N_{in}$ is as shown in FIG. 13(b), wherein the density value of the area "H" is higher than the threshold S and that of the area "L" is lower than the threshold S, the state of FIG. 13(b) represents the accurate boundary between the objective image F and the background E. Assuming that the mask producing mode 2 is selected, a partial density difference mask in which the area "H" corresponds to a logical "1" (to be painted out) and the area "L" corresponds to a logical "0" (to be vacant) is obtained. On the other hand, the partial density difference mask of the ground mask partial area $N_{mn}$ as shown in FIG. 13(e) is obtained from the ground mask M3 in the same way.

Thus obtained two mask data are synthesized according to the designated computation mode to be mask data shown in FIG. 13(f), and is stored as data into the mask memory 10.

It should be incidentally noted at this juncture that the pixels included in the partial area are processed one by one successively, not in a lump.

The above-mentioned processes are carried out on a plurality of partial areas which cover the outline of the image I3 in a group as shown in FIG. 14(a). After finishing a painting out process—(S11), a mask as shown in FIG. 14(b) is obtained.

Figure 10:
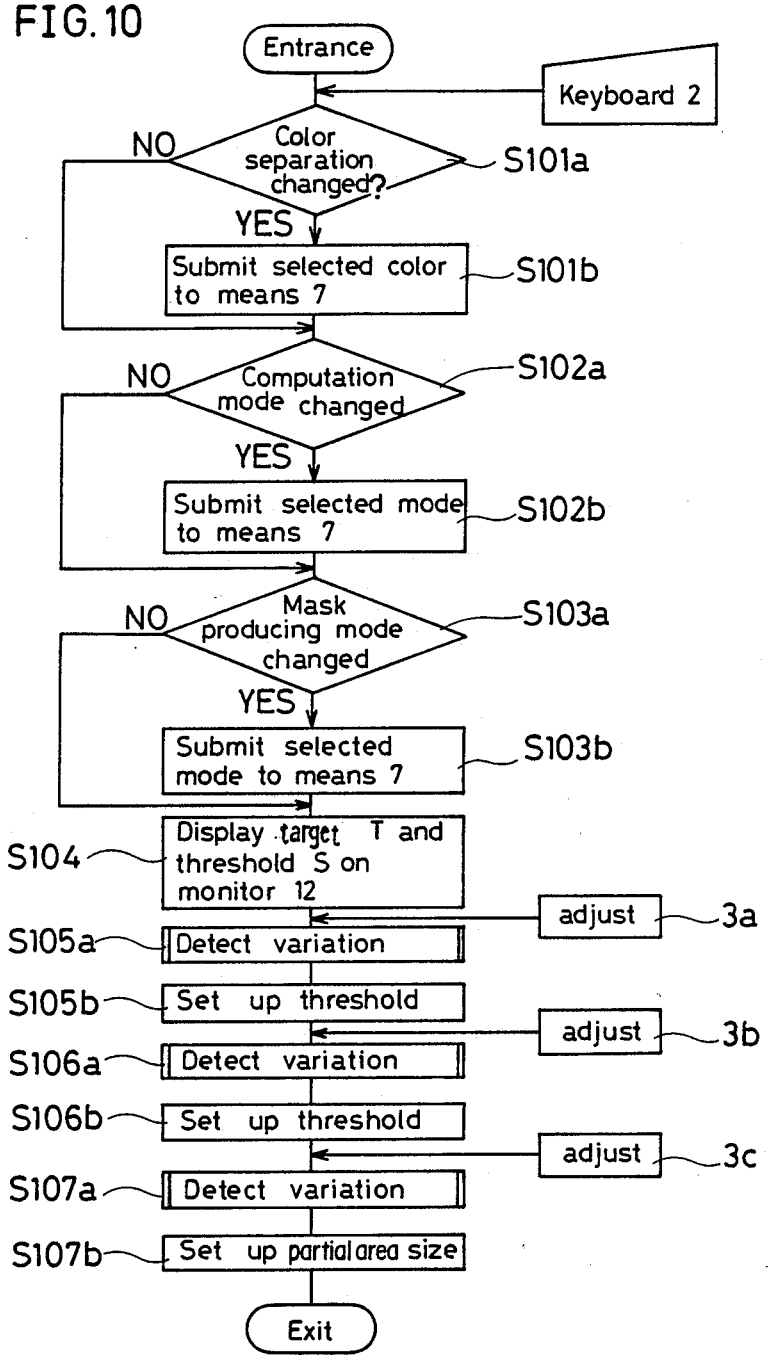
FIG. 10 shows a detailed flow chart of the condition changing process of the flow chart of FIG. 9.

FIG. 10 shows a detailed flow chart of the condition data change detection step S10 described in FIG. 7. A condition change data input from the keyboard is processed in steps 101 to 103. Precisely, when the condition change data designates the change of the color separation image to be submitted to the image extraction process, the data of the selected color separation image stored in the image memory 9 is submitted to the mask producing means 7—(S101a, S101b). When the condition change data designates the change of the computation mode, the data of the selected computation mode is submitted to the mask producing means 7—(S102a, S102b). When the data designates the change of the mask producing mode, the data of the selected mask producing mode is submitted to the mask producing means 7—(S103a, S103b).

Then the density value of the target point T and the threshold S are displayed on the display monitor 12—(S104). When a signal designating the change of the threshold S is input from the adjusting device 3, a newly setup threshold is input to the mask producing means 7. In this connection, when a single threshold is employed, only the adjusting means $3_a$ is used, while when two thresholds are employed to extract a belt-shape image as shown in FIG. 3, the adjusting means $3_a$ and $3_b$ are used—($S_{105}$, $S_{106}$). When a signal designating the change of the partial area size is input from the adjusting device 3, data of the reestablished partial area size is input to the mask producing means 7—($S_{107}$).

Figure 11:
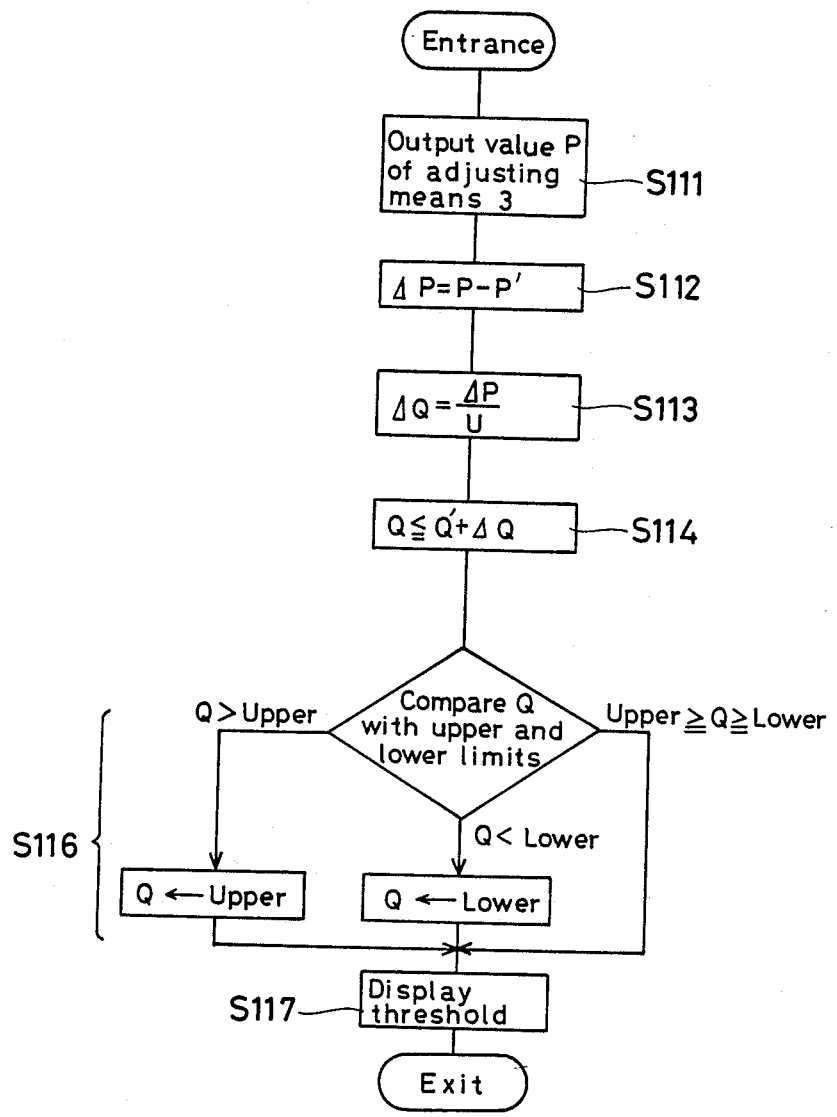
FIG. 11 shows a detailed flow chart of the variation detection process of the flow chart of FIG. 10.

FIG. 11 shows a detailed flow chart of the change detection processes of the steps $105_a$, $106_a$ and $107_a$.

At first the present output value P of the adjusting means 3 is input to a CPU—($S_{111}$), and a difference value ΔP between the present output value P and the previous output value P' is computed—($S_{112}$). The difference value ΔP is divided by a unit value U (output value of the adjusting means corresponding to a unit threshold value partial area size) to compute the variation ΔQ of the threshold value (partial area size)—($S_{113}$). Then the present threshold value (partial area size) Q corresponding to the present output of the adjusting means 3 is obtained by adding the variation ΔQ to the previous threshold value partial area size) Q'—($S_{114}$).

Thus-obtained threshold value (partial area size) Q is compared with the upper and the lower limit values already set up. When the value Q is higher than the upper limit or lower than the lower limit, the upper limit or the lower limit is to be due threshold value S (partial area size W)—($S_{116}$). The newly determined threshold value S is displayed on the display monitor 12—($S_{117}$).

An important thing to be noted is that the partial density difference mask of the overlapping portion between the mask of the objective image and the ground mask is remade, data of the overlapping portion of the ground mask data is erased from the mask memory. In such a case, the ground mask data must be read again from the disk memory.

By the way, there can be provided three mask memories, one for a ground mask, another for a partial density difference mask and the other for a synthesized mask.

The memory for a ground mask can also be used in common for storing synthesized image data.

The shape of the partial area can be a circle instead of the aforesaid square shape.

As mentioned above, since this invention adopts a method in which the outline of an objective image is detected by comparing the density values of the pixels around the outline with an optimum threshold, the accurate outline thereof can be obtained. Furthermore, by using two thresholds, the outlines of a belt-shape image can be obtained.

An image extraction mask of an objective image such as a tree, a forest or a transom having complicated spaces therein can be formed by determining proper target points and partial area size in practicing the method of this invention, when the spaces therein are of course not extracted. When a considerable number of tiny spaces exist in the images, all the surface of the image in which the objective image exists is obliged to be analyzed.

Moreover, portions of an image being simple in density distribution can be analyzed using broader partial area in order to increase operation efficiency.

Portions of an objective image being delicate in density gradation can be analyzed using a variety of thresholds to obtain a data of the correct outline thereof. In conclusion, this invention, in which the outline of an image is detected block by block, provides an efficient image extraction mask forming method and system as against to the conventional ones.

We claim:

1. A method for forming an image extraction mask in electronic image reproduction, comprising the steps of:
   (a) displaying color separation images Y (Yellow), M (Magenta), C (Cyan) and K (Black) of an original in which a determined objective image exists being stored as data in respective image memories on a display;
   (b) connecting an image memory which stores a color separation image to be processed to an image extraction mask producing means;
   (c) establishing, by determining a partial area of a fixed size on an image displayed on the display, a corresponding partial area at a corresponding location of the image memory connected to the image extraction mask producing means;
   (d) detecting an outline of the image within the partial area by comparing density values of pixels included in the partial area with a manually preset threshold initially established during a set-up procedure;
   (e) storing data obtained in step (d) into a mask memory as partial density difference mask data in which data on opposite sides of an outline are distinguishable;
   (f) carrying out the steps (c), (d) and (e) for all the partial areas which cover a whole surface of the color separation image or an entire outline of the determined objective image successively; and
   (g) painting out either an inside or an outside of a conclusive outline of the determined objective image in compliance with a command.

2. A method for forming an image extraction mask in electronic image reproduction, comprising the steps of:
   (a) displaying all the color separation images Y (Yellow), M (Magenta), C (Cyan) and K (Black) of an original in which a determined objective image exists, said objective image being stored as data in respective image memories and a ground mask to be synthesized with said color separation images being stored as data in a mask memory on the display;
   (b) connecting one out of the image memories which stores the color separation image to be processed to an image extraction mask producing means;
   (c) establishing, by determining a partial area of a fixed size on the image displayed on the display, a corresponding partial area at the corresponding locations of the image memory connected to the image extraction mask producing means and of the ground mask memory;
   (d) detecting an outline of the image within the partial area by comparing density values of pixels included in the partial area with a manually preset threshold initially established during a set-up procedure;
   (e) to obtain new partial density difference mask data, synthesizing with corresponding ground mask data, data obtained in step (d) wherein partial density difference mask data in which the data on opposite sides of the outline are distinguishable;
   (f) storing the new partial density difference mask data obtained in step (e) in the mask memory;
   (g) carrying out steps (b) and (c) for all the partial areas which cover the outline of the determined objective image; and
   (h) painting out either the inside or the outside of a conclusive outline of an image obtained by synthesizing the determined objective image data and the ground mask data in compliance with a command.

3. A method in claims 1 or 2, in which the threshold is in between the density values of pixles situated inside and outside the conclusive outline.

4. A method claimed in claims 1 or 2, in which the threshold comprises a first threshold and a second threshold for detecting a belt-shape image put between two areas of distinct densities, the first threshold being in between the density values of the belt-shape image and one of the adjacent images, and the second threshold being in between the density values of the belt-shape image and the other adjacent image.

5. A method claimed in claims 1 or 2, in which the threshold is varied according to density values of both sides of the outline of the determined objective image for each partial area.

6. A method claimed in claims 1 or 2, in which the size of the partial area is variable.

7. A method claimed in claims 1 or 2, in which each partial density difference mask is obtained by selectively using a color separation image showing a clearest outline of the determined objective image.

8. A method claimed in claims 1 or 2, in which each partial density difference mask is composed of a portion expressed by a logical "1" whose density value is higher than the threshold and a portion expressed by a logical "0" whose density value is lower than the threshold.

9. A method claimed in claims 1 or 2, in which each partial density difference mask is composed of a portion expressed by a logical "0" whose density value is higher than the threshold and a portion expressed by a logical "1" whose density value is lower than the threshold.

10. A method claimed in claim 2, in which each partial density difference mask data are synthesized with the corresponding ground mask data in an OR mode.

11. A method claimed in claim 2, in which each partial density difference mask data are synthesized with the corresponding ground mask data in an AND mode.

12. A method claimed in claim 2, in which each partial density difference mask data are synthesized with corresponding ground mask data in an exclusive-OR mode.

13. A system for forming an image extraction mask in electronic image reproduction, comprising:
 (a) image memories for storing color separation images Y (Yellow), M (Magenta), C (Cyan) and K (Black) of an original, respectively;
 (b) a mask memory;
 (c) a mask producing means;
 (d) a display means for displaying color separation image data stored in the image memories;
 (e) a partial area center designation means for designating the center of a partial area as a target on the displaying means, the image memories and the mask memory;
 (f) an input means for inputting mask producing condition data to the mask producing means;
 (g) a selection means for selecting an image memory for storing a mask processed color separation image;
 (h) a partial area establishing means for establishing, by setting up a partial area on the image displayed on the display means according to partial area data input from the input means centering around the partial area center or the target designated by the partial area center designation means, a corresponding partial area on the image memory;
 (i) an outline detecting means for detecting an outline of a determined objective image comprised in the image to be processed by comparing density values of pixels included in each partial area with a manually preset threshold initially established during a set-up procedure and stored in the mask producing means;
 (j) a data storing means for storing data obtained in the step (i) into a mask memory as a partial density difference mask in which data on opposite sides of the outline are distinguishable; and
 (k) a painting out means for painting out either the inside or the outside of a conclusive outline of the determined objective image in compliance with a demand.

14. A system for forming an image extraction mask in electronic image reproduction, comprising:
 (a) image memories for storing color separation images Y (Yellow), M (Magenta), C (Cyan) and K (Black) of an original, respectively;
 (b) a mask memory for storing ground mask data;
 (c) a mask producing means;
 (d) a display means for displaying color separation image data stored in the image memories and ground mask data stored in the mask memory;
 (e) a partial area center designation means for designating the center of a partial area as a target on the displaying means, the image memories and the mask memory;
 (f) an input means for inputting mask producing condition data to the mask producing means;
 (g) a selection means for selecting a particular one of the image memory storing the color separation image to be subjected to the mask producing means;
 (h) a partial area establishing means for establishing, by setting up a partial area on the image displayed on the display means according to partial area data input from the input means centering around the partial area center or the target designated by the partial area center designation means, corresponding partial areas on the image memory and the mask memory;
 (i) an outline detecting means for detecting an outline of a resultant objective image comprised in the image to be processed by comparing density values of pixels included in each partial area with a manually preset threshold initially established during a set-up procedure and stored in the mask producing means to determine where data on opposite sides of the outline are distinguishable;
 (j) a computation means for synthesizing said outline data with a corresponding portion of the ground mask data to make a new partial density difference mask data;
 (k) a data storing means for storing the new partial density difference mask data determined by said computation means in the mask memory; and
 (l) a painting out means for painting out either an inside or the outside of a conclusive outline of the determined objective image in compliance with a command.

15. A system claimed in claims 13 or 14, in which the partial area center designating means is a digitizer.

16. A system claimed in claims 13 or 14, in which the input means comprises:
 (a) a keyboard for inputting mask producing condition data;
 (b) an adjusting means for adjusting the partial area size; and (c) an adjusting means for adjusting the threshold.

17. A method for forming an image extraction mask in electronic image reproduction without manually tracing an approximate or a precise image outline comprising the steps of:
- (a) storing, in image memory, the data of a color separation image of an image obtained by electrically scanning the image,
- (b) displaying the color separation image including a specific image to produce an image extraction mask by reading the color separation image data stored in the image memory,
- (c) setting up a plurality of partial areas as spaced points to define an outline of the specific image displayed,
- (d) visually selecting the density value wherein the boundary line of density between the displayed specific image and a background image surrounding the image, defines the outline of the specific image,
- (e) setting up the density value selected by step (d) as the value of a threshold,
- (f) establishing a partial density difference mask by comparing each of elements of the image in a partial area with the value of the threshold,
- (g) visually establishing a group of partial density difference masks along all of the boundary lines of the specific image by repeating step (f), and
- (h) storing in the mask memory the mask data obtained by step (g).

18. The method of claim 17, wherein step (d) further includes displaying on a display the density value at a target point so as to determine the density value in which the boundary line of density and the outline of the image generally correspond with each other.

* * * * *